United States Patent
Jiang et al.

(10) Patent No.: US 9,661,623 B2
(45) Date of Patent: May 23, 2017

(54) METHOD AND APPARATUS FOR PERFORMING EPDCCH RESOURCE ELEMENT MAPPING IN COMMUNICATION NETWORK

(71) Applicant: Alcatel Lucent, Boulogne Billancourt (FR)

(72) Inventors: Qi Jiang, Shanghai (CN); Zheng Liu, Shanghai (CN); Matthew Baker, Canterbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 151 days.

(21) Appl. No.: 14/399,687

(22) PCT Filed: Apr. 22, 2013

(86) PCT No.: PCT/IB2013/001147
§ 371 (c)(1),
(2) Date: Nov. 7, 2014

(87) PCT Pub. No.: WO2013/167967
PCT Pub. Date: Nov. 14, 2013

(65) Prior Publication Data
US 2015/0131554 A1    May 14, 2015

(30) Foreign Application Priority Data
May 9, 2012  (CN) .......................... 2012 1 0142846

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01)

(58) Field of Classification Search
CPC .......................... H04W 72/042; H04L 5/0053
See application file for complete search history.

(56) References Cited

U.S. PATENT DOCUMENTS

2011/0044391 A1    2/2011  Ji et al.
2011/0280193 A1   11/2011  Lindh et al.
(Continued)

FOREIGN PATENT DOCUMENTS

CN     102368759 A     3/2012
KR     2011-0020732    3/2011
(Continued)

OTHER PUBLICATIONS

MCC Support, "Final Report of 3GPP TSG RAN WG1 #68 v1.0.0", Mar. 26-30, 2012, 3GPP TSG RAN WG1 Meeting #68bis, R1-120951, pp. 59-70.*
(Continued)

*Primary Examiner* — Paul H Masur
(74) *Attorney, Agent, or Firm* — Fay Sharpe, LLP

(57) ABSTRACT

The application provides for performing resource element mapping of an ePDCCH for user equipments served by a base station. The base station determines resource element mapping patterns for user equipments and performs resource element mapping based upon determined resource element mapping patterns. Resource element mapping is performed for the ePDCCH by excluding resource elements corresponding to a legacy signal or by puncturing the resource elements corresponding to the legacy signal; then the base station sends information about the resource element mapping patterns determined for user equipments and a downlink control signaling to the user equipments. The application also provides for: performing ePDCCH decoding in a user equipment of a communication network; in a base station of a communication network, notifying a user equipment of a size of an enhanced resource element group; in a
(Continued)

base station of a communication network, notifying a user equipment of a mapping pattern.

14 Claims, 3 Drawing Sheets

(56) References Cited

U.S. PATENT DOCUMENTS

| | | | |
|---|---|---|---|
| 2011/0310829 A1* | 12/2011 | Ji | H04L 5/0037 370/329 |
| 2013/0100901 A1* | 4/2013 | Shan | H04L 5/0048 370/329 |
| 2013/0194931 A1* | 8/2013 | Lee | H04L 5/0053 370/241 |
| 2013/0294362 A1* | 11/2013 | Xu | H04W 72/042 370/329 |
| 2014/0071934 A1* | 3/2014 | Frenne | H04L 5/001 370/330 |
| 2015/0063241 A1 | 3/2015 | Shimezawa et al. | |

FOREIGN PATENT DOCUMENTS

| | | |
|---|---|---|
| RU | 2008-120021 | 11/2009 |
| WO | WO 2007/050231 | 5/2007 |
| WO | WO 2010/019088 | 2/2010 |
| WO | WO 2011/093671 A2 | 8/2011 |
| WO | WO 2012/044083 | 4/2012 |
| WO | WO 2012/109542 A1 | 8/2012 |
| WO | WO 2013/022326 A2 | 2/2013 |

OTHER PUBLICATIONS

NEC Group, "DCI multiplexing for E-PDCCH," 3GPP TSG-RAN WG1 #68bis, R1-121337, Jeju, South Korea, Mar. 26-30, 2012, 4 pages.

3GPOP TSG-RAN WG1 #68, R1-120330, "Search Space Design for E-PDCCH," Research in Motion, UK Limited, Jan. 31, 2012, pp. 1-6.

Ericsson, "Details of multiplexing of DCI messages," 3GPP TSG-RAN WG1 #68bis, R1-121023, Jeju, Republic of Korea, Mar. 26-30, 2012, 3 pages.

LG-Ericsson, "Consideration on enhanced PDCCH to Res mapping," $3^{rd}$ Generation Partnership Project (3GPP), 3GPP TSG RAN WG1 #67, R1-114189, pp. 1-2, XP050562133, San Francisco, USA, Nov. 14-18, 2011.

Panasonic, "Multiplexing of ePDCCHs and ePDCCH RE mapping," $3^{rd}$ Generation Partnership Project (3GPP), 3GPP TSG RAN WG1 Meeting #68bis, R1-120237, pp. 1-4, XP050562794, Dresden, Germany, Feb. 6-12, 2012.

Texas Instruments, "Considerations on E-PDCCH mapping and multiplexing," $3^{rd}$ Generation Partnership Project (3GPP), 3GPP TSG RAN WG1 Meeting #68bis, R1-121213, pp. 1-3, XP050599509, Jeju, Korea, Mar. 26-30, 2012.

NEC Group, "DCI Multiplexing for E-PDCCH," $3^{rd}$ Generation Partnership Project (3GPP), 3GPP TSG RAN WG1 Meeting #68, R1-120257, pp. 1-7, XP050562811, Dresden, Germany, Feb. 6-10, 2012.

ZTE Corporation, "Mapping Design for enhanced PDCCH," $3^{rd}$ Generation Partnership Project (3GPP), 3GPP TSG RAN WG1 Meeting #68 bis, R1-121055, pp. 1-4, XP050599358, Jeju, Korea, Mar. 26-30, 2012.

Fujitsu, "Rate matching vs puncturing of ePDCCH," $3^{rd}$ Generation Partnership Project (3GPP), 3GPP TSG RAN WG1 Meeting #69, R1-122067, pp. 1-5, XP050600356, Prague, Czech Republic, May 21-25, 2012.

InterDigital Communications et al., "PRS collision handling for ePDCCH," $3^{rd}$ Generation Partnership Project (3GPP), 3GPP TSG RAN WG1 Meeting #70, R1-123408, pp. 1-4, XP050661294, Qingdao, China, Aug. 13-17, 2012.

Panasonic, "ePDCCH rate matching / puncturing and colliding signals analysis," $3^{rd}$ Generation Partnership Project (3GPP), 3GPP TSG RAN WG1 Meeting #69, R1-122200, pp. 1-3, XP050600464, Prague, Czech Republic, May 21-25, 2012.

International Search Report for PCT/IB2013/001147 dated Nov. 7, 2013.

* cited by examiner

METHOD AND APPARATUS FOR PERFORMING EPDCCH RESOURCE ELEMENT MAPPING IN COMMUNICATION NETWORK

FIELD OF THE INVENTION

The present disclosure relates to a communication network and particularly to a method and apparatus for, in a base station of a communication network, performing resource element mapping of an enhanced Physical Downlink Control Channel (ePDCCH) for respective user equipments served by the base station and a method and apparatus for decoding an ePDCCH in a user equipment of a communication network.

BACKGROUND OF THE INVENTION

In the 3GPP Release 11, the design of an ePDCCH is under discussion based on the considerations of enhance Interference Coordination (eICIC), new carrier-aggregation enhanced carrier types, Coordinated Multi-Point (CoMP) and Downlink Multi-Input Multi-Output (DL MIMO). Based upon the discussion at the 3GPP Release 11, the ePDCCH will be located in a legacy Physical Downlink Shared Channel (PDSCH). Some characteristics of the PDSCH itself will result in some differences between the design of a mapping rule of the ePDCCH and the design of a mapping rule of the legacy PDCCH.

In view of this, there is a need to design a new design rule for the ePDCCH.

SUMMARY OF THE INVENTION

A new design rule shall be designed for an ePDCCH taking into account the following considerations:
Definitions of enhanced Control Channel Element (eCCE)/enhanced Resource Element Group (eREG);
Resource Element (RE) mapping pattern, i.e., frequency-first or time-first; and
RE mapping pattern taking into account collision with a legacy signal, e.g., a Primary Synchronization Signal (PSS)/Secondary Synchronization Signal (SSS), a Cell Reference Signal (CRS), a Broadcast Channel (PBCH), a Position Reference Signal (PRS), a Channel Status Information Reference Signal (CSI-RS), etc.

In view of the foregoing considerations, in an aspect of the invention, the invention proposes in an embodiment a method, in a base station of a communication network, of performing resource element mapping of an ePDCCH for respective user equipments served by the base station, wherein the method includes the steps of: determining resource element mapping patterns for the respective user equipments, and performing the resource element mapping based upon the determined resource element mapping patterns, wherein the resource element mapping patterns include performing the resource element mapping for the ePDCCH by excluding resource elements corresponding to a legacy signal or performing the resource element mapping for the ePDCCH by puncturing the resource elements corresponding to the legacy signal; and sending information about the resource element mapping patterns determined for the respective user equipments and a downlink control signaling to the respective user equipments.

The invention proposes in another embodiment a method, in a user equipment of a communication network, of performing ePDCCH decoding, wherein the method includes the steps of: receiving from a base station information about a resource element mapping pattern, wherein the resource element mapping pattern includes performing resource element mapping for an ePDCCH by excluding resource elements corresponding to a legacy signal or performing the resource element mapping for the ePDCCH by puncturing the resource elements corresponding to the legacy signal; and performing the ePDCCH decoding based upon the information about the resource element mapping pattern.

In another aspect, the invention proposes in an embodiment a method, in a base station of a communication network, of notifying a user equipment of a size of an enhanced resource element group, wherein the method includes the steps of: determining the size of the enhanced resource element group based upon an interleaving complexity; and notifying the user equipment of information about the determined size of the enhanced resource element group.

In a further aspect, the invention proposes in an embodiment a method, in a base station of a communication network, of notifying a user equipment of a mapping pattern, wherein the method includes the steps of: determining a resource element mapping pattern based upon an extent of collision with a legacy signal during resource element mapping, wherein the resource element mapping pattern includes frequency-first or time-first; and notifying the user equipment of the determined resource element mapping pattern.

In a further aspect, the invention proposes in an embodiment an apparatus, in a base station of a communication network, for performing resource element mapping of an ePDCCH for respective user equipments served by the base station, wherein the apparatus includes: a mapping module configured to determine resource element mapping patterns for the respective user equipments, and to perform the resource element mapping based upon the determined resource element mapping patterns, wherein the resource element mapping patterns include performing the resource element mapping for the ePDCCH by excluding resource elements corresponding to a legacy signal or performing the resource element mapping for the ePDCCH by puncturing the resource elements corresponding to the legacy signal; and a sending module configured to send information about the resource element mapping patterns determined for the respective user equipments and a downlink control signaling to the respective user equipments.

The invention proposes in another embodiment an apparatus, in a user equipment of a communication network, for performing ePDCCH decoding, wherein the apparatus includes: a receiving module configured to receive from a base station information about a resource element mapping pattern, wherein the resource element mapping pattern includes performing resource element mapping for an ePDCCH by excluding resource elements corresponding to a legacy signal or performing the resource element mapping for the ePDCCH by puncturing the resource elements corresponding to the legacy signal; and a decoding module configured to perform the ePDCCH decoding based upon the information about the resource element mapping pattern.

The respective aspects of the invention will become more apparent from the following description of the embodiments.

BRIEF DESCRIPTION OF DRAWINGS

The foregoing and other features of the invention will become more apparent upon review of the following detailed description of non-limiting embodiments taken with reference to the drawings in which.

Identical or like reference numerals denote identical or like components throughout the drawings.

DETAILED DESCRIPTION OF EMBODIMENTS

Respective embodiments of the invention will be described primarily with respect to definitions of eCCE/eREG and RE mapping pattern and RE mapping rule taking into account collision with a legacy signal.

1. Definitions of eCCE/eREG

In view of the number of REs in a Physical Resource Block (PRB) pair, it is advantageous to design the size of 36 REs per eCCE, that is, an eCCE includes 36 REs. This is substantially consistent with the design of the size of a CCE in a legacy PDCCH. It shall be noted that the size of an eCCE can alternatively be another size, e.g., 72 REs, without departing from an underlying design principle, as can be appreciated by those skilled in the art, and a repeated description thereof will be omitted here.

Given the size of 36 REs per eCCE, a relationship between an eREG and an eCCE can include the following alternatives:

18 eREGs per eCCE and 2 REs per eREG;
9 eREGs per eCCE and 4 REs per eREG;
6 eREGs per eCCE and 6 REs per eREG;
4 eREGs per eCCE and 9 REs per eREG; and
2 eREGs per eCCE and 18 REs per eREG.

On the premise that the size of an eCCE has been determined, the size of an eREG can be predefined between a base station and a user equipment or configurable as required in practice.

In the case of a configurable size of an eREG, the base station is required to notify the user equipment of the size of an eREG. Specifically, firstly the base station determines the size of an eREG based upon the complexity of interleaving; and then the base station notifies the user equipment of information about the determined size of an eREG. The information about the size of an eREG can be sent, for example via a high layer signaling (e.g., RRC signaling), or a broadcast signaling, etc.

2. RE Mapping Pattern

Simply for the illustrative purpose, an RE mapping pattern will be described below taking 4 eREGs per eCCE and 9 REs per eREG as an example.

Figure 1:
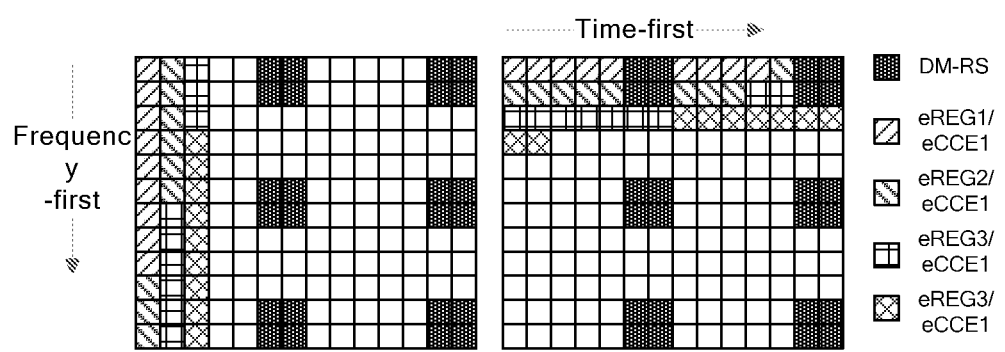
FIG. 1 illustrates a frequency-first/time-first mapping pattern for a localized transmission mode according to an embodiment of the invention.

For a localized transmission mode between the base station and the user equipment, eREGs/eCCEs shall be mapped sequentially onto corresponding PRB pairs. As illustrated in FIG. 1, for this transmission mode, a time-first or frequency-first RE mapping pattern can be selected.

Figure 2:
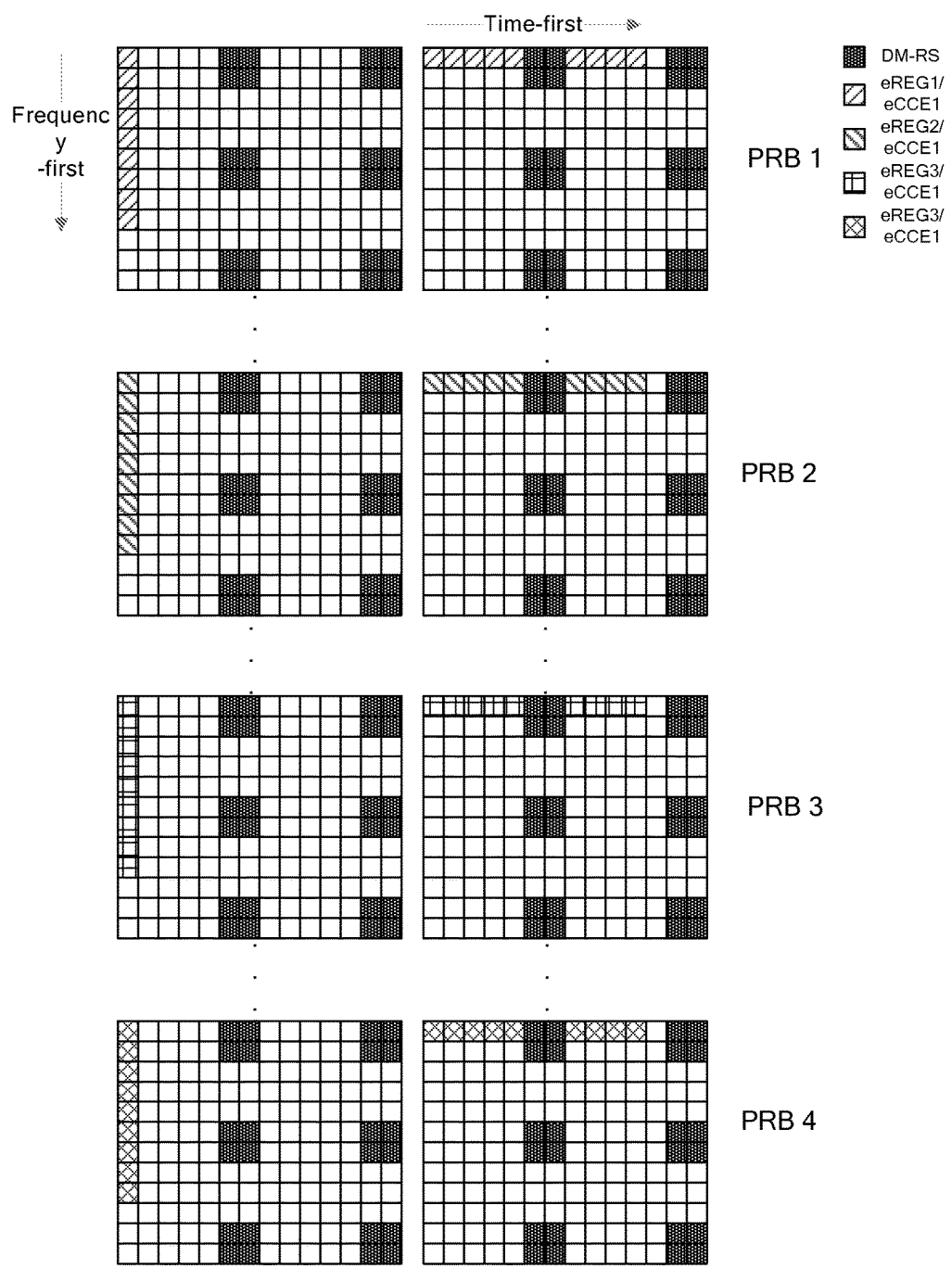
FIG. 2 illustrates a frequency-first/time-first mapping pattern for a distributed transmission mode according to an embodiment of the invention.

For a distributed transmission mode between the base station and the user equipment, eREGs/eCCEs shall be mapped onto corresponding PRB pairs for a gain of frequency diversity, and moreover a frequency distance between the respective eREGs shall be kept as large as possible based upon the allocated PRB pairs. As illustrated in FIG. 2, for this transmission mode, also a time-first or frequency-first RE mapping pattern can be selected.

In FIG. 1 and FIG. 2, "■" represents a DM-RS (i.e., a demodulation reference signal), "▨" represents an eREG1/eCCE1 (i.e., the first eREG in an eCCE), "◨" represents an eREG2/eCCE1 (i.e., the second eREG in the eCCE), "⊞" represents an eREG3/eCCE1 (i.e., the third eREG in the eCCE), and "⊠" represents an eREG4/eCCE1 (i.e., the fourth eREG in the eCCE).

Specifically an RE mapping pattern can be determined based upon the extent of collision with a legacy signal during RE mapping. Firstly the base station determines whether the extent of collision with the legacy signal during RE mapping is above a threshold; and if a determination result is positive, then the RE mapping pattern is determined as time-first, or if the determination result is negative, then the RE mapping pattern is determined as frequency-first. Then the base station notifies the user equipment of the determined RE mapping pattern.

3. RE Mapping Pattern Considering Collision with Legacy Signal

Figure 3:
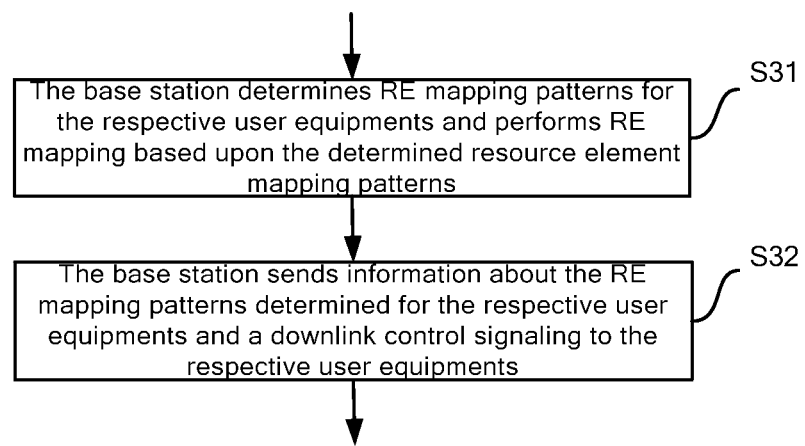
FIG. 3 illustrates a flow chart of a method, in a base station of a communication network, of performing resource element mapping of an ePDCCH for respective user equipments served by the base station according to an embodiment of the invention.

Referring to FIG. 3, firstly in the step S31, the base station determines RE mapping patterns for the respective user equipments and performs RE mapping based upon the determined RE mapping patterns. The RE mapping patterns include performing RE mapping for the ePDCCH by excluding REs corresponding to a legacy signal or performing RE mapping for the ePDCCH by puncturing the REs corresponding to the legacy signal.

Then in the step S32, the base station sends information about the RE mapping patterns determined for the respective user equipments and a downlink control signaling to the respective user equipments.

At the user equipment side, firstly the user equipment knows from the base station side over which PRB pair(s) the user equipment shall receive the ePDCCH, and then the user equipment performs ePDCCH decoding based upon the information about the RE mapping pattern received from the base station side.

The following description will be given taking different types of legacy signals as examples respectively.

(1) The legacy signal is a PSS/SSS, a CRS or a PBCH.

Since the location of REs corresponding to this kind of legacy signal has been known to the respective user equipments, preferably the RE mapping pattern selected by the base station can be to perform RE mapping for the ePDCCH by excluding the REs corresponding to this kind of legacy signal.

Correspondingly at the user equipment side, since the user equipment knows from the information about the RE mapping pattern received from the base station that the base station performs RE mapping for the ePDCCH by excluding the REs corresponding to the legacy signal, the user equipment will perform ePDCCH decoding in a rate matching manner.

Of course, for this kind of legacy signal, the base station can alternatively perform RE mapping for the ePDCCH by puncturing the REs corresponding to this kind of legacy signal. Then at the user equipment side, the user equipment will perform ePDCCH decoding in a puncturing manner.

(2) The legacy signal is a PRS.

For this legacy signal, the following discussion will be made respectively for a user equipment configured with a PRS and a user equipment configured without a PRS.

① User Equipment Configured with PRS

For each of these user equipments, since it knows the location of a PRC configured for it, what described above in (1) can be applied, and a repeated description thereof will be omitted here for the sake of conciseness.

② User Equipment Configured without PRS

In this situation, in an example, the RE mapping pattern selected by the user equipment can be to perform RE mapping for the ePDCCH by excluding the REs corresponding to this kind of legacy signal.

Since the user equipment configured without a PRS has no knowledge of where the other user equipments configured with a PRS are configured with the PRS, the base station will notify these user equipments configured without a PRS of information about a sub-frame in which the PRS is present in addition to the selected RE mapping pattern.

Correspondingly at the user equipment side, the user equipment configured without a PRS performs ePDCCH decoding in a rate matching manner according to the information about the RE mapping pattern and information about the sub-frame in which the PRS is present received from the base station.

In another example, the RE mapping pattern selected by the base station can be to perform RE mapping for the ePDCCH by puncturing the REs corresponding to this kind of legacy signal.

Likewise, since the user equipment configured without a PRS has no knowledge of where the other user equipments configured with a PRS are configured with the PRS, the base station will notify these user equipments configured without a PRS of information about a sub-frame in which the PRS is present in addition to the selected RE mapping pattern.

Correspondingly at the user equipment side, the user equipment configured without a PRS performs ePDCCH decoding in a punching manner according to the information about the RE mapping pattern and information about the sub-frame in which the PRS is present received from the base station. Optionally ePDCCH decoding can be performed in the punching manner by setting an influence of the punched REs upon the other REs to zero to thereby further improve the accuracy of ePDCCH decoding.

In this example, if the base station does not notify these user equipments configured without a PRS of the information about the sub-frame in which the PRS is present, then the user equipment configured without a PRS can alternatively perform ePDCCH decoding normally.

(3) The legacy signal is a CSI-RS.

For this kind of legacy signal, the adopted RE mapping pattern is substantially similar to that described above in (2) except that for the user equipments configured without a CSI-RS, the user equipment will notify these user equipments configured without a CSI-RS of information about a sub-frame in which a CSI-RS is present and REs occupied by the CSI-RS.

Those skilled in the art shall appreciate that apparently the invention will not be limited to the foregoing exemplary embodiments and can be embodied in other specific forms without departing from the spirit or essence of the invention. Accordingly the embodiments shall be construed anyway to be exemplary and non-limiting. Any reference numerals in the claims shall not be construed as limiting the claims in question. Moreover apparently the term "comprising" will not preclude another element(s) or step(s), and the term "a" or "an" preceding an element will not preclude plurality of such an element. A plurality of elements stated in an apparatus claim can alternatively be embodied in software or hardware as a single element. The terms "first", "second", etc., are intended to designate a name but not to suggest any specific order.

The invention claimed is:

1. A method, in a base station of a communication network, of performing resource element mapping of an ePDCCH for respective user equipments served by the base station, wherein the method comprises:

determining resource element mapping patterns for the respective user equipments, and performing the resource element mapping based upon the determined resource element mapping patterns, wherein the resource element mapping patterns comprise performing the resource element mapping for the ePDCCH by excluding resource elements corresponding to a legacy signal; and sending information about the resource element mapping patterns determined for the respective user equipments and a downlink control signaling to the respective user equipments.

2. The method according to claim 1, wherein the legacy signal is a primary/secondary synchronization signal or a cell reference signal or a broadcast signal.

3. The method according to claim 1, wherein the legacy signal is a location reference signal or a channel status information reference signal.

4. The method according to claim 1, wherein when the legacy signal is a location reference signal or a channel status information reference signal, the resource element mapping pattern determined for a user equipment configured without the legacy signal among the respective user equipments in the determining is to perform the resource element mapping for the ePDCCH by excluding the resource elements corresponding to the legacy signal.

5. The method according to claim 4, wherein the sending further comprises:

when the legacy signal is the location reference signal, notifying the user equipment configured without the legacy signal of information about a sub-frame in which the location reference signal is present; and when the legacy signal is the channel status information reference signal, notifying the user equipment configured without the legacy signal of information about a sub-frame in which the channel status information reference signal is present and resource elements occupied by the channel status information reference signal.

6. A method, in a user equipment of a communication network, of performing ePDCCH decoding, wherein the method comprises:

receiving from a base station information about a resource element mapping pattern, wherein the resource element mapping pattern comprises performing resource element mapping for an ePDCCH by excluding resource elements corresponding to a legacy signal; and performing the ePDCCH decoding based upon the information about the resource element mapping pattern.

7. The method according to claim 6, wherein when the legacy signal is a primary/secondary synchronization signal or a cell reference signal or a broadcast signal, the performing comprises:

performing the ePDCCH decoding in a rate matching manner.

8. The method according to claim 6, wherein when the legacy signal is a location reference signal or a channel status information reference signal, and the user equipment is a user equipment configured with the legacy signal,
the performing comprises:
performing the ePDCCH decoding in a rate matching manner.

9. The method according to claim 6, wherein when the legacy signal is a location reference signal or a channel status information reference signal, and the user equipment is a user equipment configured without the legacy signal,
the receiving further comprises:
when the legacy signal is the location reference signal, receiving from the base station information about a sub-frame in which the location reference signal is present; and
when legacy signal is the channel status information reference signal, receiving from the base station information about a sub-frame in which the channel status information reference signal is present and resource elements occupied by the channel status information reference signal; and
the performing comprises:
performing the ePDCCH decoding in a rate matching manner.

10. An apparatus, in a base station of a communication network, for performing resource element mapping of an ePDCCH for respective user equipments served by the base station, wherein the apparatus comprises:
a mapping module configured to determine resource element mapping patterns for the respective user equipments, and to perform the resource element mapping based upon the determined resource element mapping patterns, wherein the resource element mapping patterns comprise performing the resource element mapping for the ePDCCH by excluding resource elements corresponding to a legacy signal; and
a sending module configured to send information about the resource element mapping patterns determined for the respective user equipments and a downlink control signaling to the respective user equipments.

11. An apparatus, in a user equipment of a communication network, for performing ePDCCH decoding, wherein the apparatus comprises:
a receiving module configured to receive from a base station information about a resource element mapping pattern, wherein the resource element mapping pattern comprises performing resource element mapping for an ePDCCH by excluding resource elements corresponding to a legacy signal; and
a decoding module configured to perform the ePDCCH decoding based upon the information about the resource element mapping pattern.

12. A method, in a base station of a communication network, of performing resource element mapping of an ePDCCH for respective user equipments served by the base station, wherein the method comprises:
determining resource element mapping patterns for the respective user equipments, and performing the resource element mapping based upon the determined resource element mapping patterns, wherein the resource element mapping patterns comprise performing the resource element mapping for the ePDCCH by excluding resource elements corresponding to a legacy signal or performing the resource element mapping for the ePDCCH by puncturing the resource elements corresponding to the legacy signal; and sending information about the resource element mapping patterns determined for the respective user equipments and a downlink control signaling to the respective user equipments;
wherein when the legacy signal is a location reference signal or a channel status information reference signal, the resource element mapping pattern determined for a user equipment configured without the legacy signal among the respective user equipments in the determining is to perform the resource element mapping for the ePDCCH.

13. The method according to claim 12, wherein the sending further comprises:
when the legacy signal is the location reference signal, notifying the user equipment configured without the legacy signal of information about a sub-frame in which the location reference signal is present; and
when the legacy signal is the channel status information reference signal, notifying the user equipment configured without the legacy signal of information about a sub-frame in which the channel status information reference signal is present and resource elements occupied by the channel status information reference signal.

14. A method, in a user equipment of a communication network, of performing ePDCCH decoding, wherein the method comprises:
receiving from a base station information about a resource element mapping pattern, wherein the resource element mapping pattern comprises performing resource element mapping for an ePDCCH by excluding resource elements corresponding to a legacy signal or performing the resource element mapping for the ePDCCH by puncturing the resource elements corresponding to the legacy signal; and
performing the ePDCCH decoding based upon the information about the resource element mapping pattern,
wherein when the legacy signal is a location reference signal or a channel status information reference signal, and the user equipment is a user equipment configured without the legacy signal,
the receiving further comprises:
when the legacy signal is the location reference signal, receiving from the base station information about a sub-frame in which the location reference signal is present; and
when legacy signal is the channel status information reference signal, receiving from the base station information about a sub-frame in which the channel status information reference signal is present and resource elements occupied by the channel status information reference signal; and
the performing comprises:
when the resource element mapping pattern is to perform the resource element mapping for the ePDCCH by excluding the resource elements corresponding to the legacy signal, performing the ePDCCH decoding in a rate matching manner; and
when the resource element mapping pattern is to perform the resource element mapping for the ePDCCH by puncturing the resource elements corresponding to the legacy signal, performing the ePDCCH decoding in a puncturing pattern.

* * * * *